United States Patent
Janarthanam et al.

(10) Patent No.: US 12,227,065 B2
(45) Date of Patent: Feb. 18, 2025

(54) TRACTION BATTERY PACK PROTECTION AND LOAD DISTRIBUTION STRATEGIES

(71) Applicant: FORD GLOBAL TECHNOLOGIES, LLC, Dearborn, MI (US)

(72) Inventors: Suriyaprakash Ayyangar Janarthanam, Canton, MI (US); Kanchana Perumalla, Troy, MI (US); Amar Marpu, Canton, MI (US); Michael M. Magoulick, Livonia, MI (US); Afzal Mohammed, Northville, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 335 days.

(21) Appl. No.: 17/714,216

(22) Filed: Apr. 6, 2022

(65) Prior Publication Data
US 2023/0322306 A1 Oct. 12, 2023

(51) Int. Cl.
| | |
|---|---|
| *B60K 1/04* | (2019.01) |
| *B60L 50/64* | (2019.01) |
| *B62D 25/20* | (2006.01) |
| *B62D 27/02* | (2006.01) |
| *B62D 29/00* | (2006.01) |
| *B60K 1/00* | (2006.01) |

(52) U.S. Cl.
CPC ............ *B60K 1/04* (2013.01); *B60L 50/64* (2019.02); *B62D 25/20* (2013.01); *B62D 27/02* (2013.01); *B62D 29/007* (2013.01); *B60K 2001/005* (2013.01); *B60K 2001/0438* (2013.01)

(58) Field of Classification Search
CPC .............. B60K 1/04; B60K 2001/0438; B60K 2001/005; H01M 50/242; H01M 50/244; B60L 3/0015; B60L 3/0007

USPC ............ 296/204, 193.07, 187.07, 8
See application file for complete search history.

(56) References Cited

U.S. PATENT DOCUMENTS

| | | | | |
|---|---|---|---|---|
| 5,620,057 A | * | 4/1997 | Klemen | B60K 11/06 180/68.5 |
| 9,862,427 B2 | | 1/2018 | Berger et al. | |
| (Continued) | | | | |

FOREIGN PATENT DOCUMENTS

| | | | | |
|---|---|---|---|---|
| CN | 110313082 A | * | 10/2019 | ............ B60K 1/04 |
| DE | 102020107366 A1 | * | 9/2021 | |
| WO | 2019105760 A1 | | 6/2019 | |

OTHER PUBLICATIONS

Text CN110313082 (Year: 2019).*
Text DE102020107366 (Year: 2021).*

*Primary Examiner* — Dennis H Pedder
(74) *Attorney, Agent, or Firm* — David B. Kelley; Carlson, Gaskey & Olds, P.C.

(57) ABSTRACT

Protection and load distribution strategies are disclosed for electrified vehicle traction battery packs. Exemplary battery protection structures may include a corrugated portion and at least one flat sheet portion that are joined together. The battery protection structure may be integrated as part of an outer enclosure assembly of the traction battery pack or could embody a skid plate design that is a separate structure from the outer enclosure assembly. The battery protection structures may be configured for absorbing and transferring energy during vehicle loading events, thereby minimizing the transfer of loads inside the battery pack where relatively sensitive battery internal components are housed.

5 Claims, 5 Drawing Sheets

(56) References Cited

U.S. PATENT DOCUMENTS

| | | |
|---|---|---|
| 9,937,781 B1 | 4/2018 | Bryer et al. |
| 9,944,243 B2* | 4/2018 | Nusier ................ H05K 5/0073 |
| 10,886,513 B2 | 1/2021 | Stephens et al. |
| 2015/0249240 A1* | 9/2015 | Hihara ................ H01M 8/2475 |
| | | 180/68.5 |
| 2018/0062224 A1* | 3/2018 | Drabon ............... H01M 10/625 |
| 2021/0214021 A1 | 7/2021 | Aitharaju et al. |

* cited by examiner

TRACTION BATTERY PACK PROTECTION AND LOAD DISTRIBUTION STRATEGIES

TECHNICAL FIELD

This disclosure relates generally to electrified vehicles, and more particularly to traction battery pack protection structures.

BACKGROUND

Some electrified vehicles package a traction battery pack at external, underbody locations of the vehicle. At such a mounting location, portions of the traction battery pack may be susceptible to ground events (e.g., debris strikes, stone pecking, etc.).

SUMMARY

An electrified vehicle according to an exemplary aspect of the present disclosure includes, among other things, a frame, a traction battery pack mounted relative to the frame, and a battery protection structure configured to minimize a transfer of a load to an internal component of the traction battery pack. The battery protection structure includes a corrugated portion and a flat sheet portion that is joined to the corrugated portion.

In a further non-limiting embodiment of the foregoing electrified vehicle, the corrugated portion is integrated as part of a floor section of a tray of an outer enclosure assembly of the traction battery pack.

In a further non-limiting embodiment of either of the foregoing electrified vehicles, the internal component is a heat exchanger plate or a battery cell.

In a further non-limiting embodiment of any of the foregoing electrified vehicles, a gap extends between the flat sheet portion and the heat exchanger plate.

In a further non-limiting embodiment of any of the foregoing electrified vehicles, the flat sheet portion is positioned in abutting contact with the heat exchanger plate.

In a further non-limiting embodiment of any of the foregoing electrified vehicles, the battery protection structure is a separate and distinct structure from any portion of an outer enclosure assembly of the traction battery pack.

In a further non-limiting embodiment of any of the foregoing electrified vehicles, the battery protection structure is positioned between a floor section of a tray of the outer enclosure assembly and the internal component.

In a further non-limiting embodiment of any of the foregoing electrified vehicles, the internal component is a heat exchanger plate or a battery cell.

In a further non-limiting embodiment of any of the foregoing electrified vehicles, the battery protection structure is a skid plate assembly that is mounted to the frame.

In a further non-limiting embodiment of any of the foregoing electrified vehicles, the corrugated portion is positioned between a tray of an outer enclosure assembly of the traction battery pack and the flat sheet portion.

In a further non-limiting embodiment of any of the foregoing electrified vehicles, the flat sheet portion is positioned between a tray of an outer enclosure assembly of the traction battery pack and the corrugated portion.

In a further non-limiting embodiment of any of the foregoing electrified vehicles, the corrugated portion is sandwiched between the flat sheet portion and a second flat sheet portion.

In a further non-limiting embodiment of any of the foregoing electrified vehicles, at least one of the corrugated portion or the flat sheet portion includes a plurality of mounting brackets.

In a further non-limiting embodiment of any of the foregoing electrified vehicles, the corrugated portion and the flat sheet portion are both metallic components.

In a further non-limiting embodiment of any of the foregoing electrified vehicles, the corrugated portion and the flat sheet portion are each made of a boron-alloyed steel.

In a further non-limiting embodiment of any of the foregoing electrified vehicles, the corrugated portion includes an alternating pattern of ridges and grooves.

In a further non-limiting embodiment of any of the foregoing electrified vehicles, the corrugated portion is configured to deform for absorbing energy imparted by the load, and the flat sheet portion is configured to distribute the load.

In a further non-limiting embodiment of any of the foregoing electrified vehicles, the flat sheet portion is joined to the corrugated portion using a structural adhesive, a weld, or a rivet.

An electrified vehicle according to another exemplary aspect of the present disclosure includes, among other things, a traction battery pack including an outer enclosure assembly and a battery internal component housed inside the outer enclosure assembly. A battery protection structure is configured to minimize a transfer of a load to the battery internal component during a vehicle loading event. The battery protection structure includes a corrugated portion integrated into a tray of the outer enclosure assembly.

An electrified vehicle according to another exemplary aspect of the present disclosure includes, among other things, a frame, a traction battery pack mounted relative to the frame, and a battery protection structure mounted to the frame and configured to minimize a transfer of a load into the traction battery pack during a vehicle loading event. The battery protection structure is a skid plate assembly having a corrugated portion and a flat sheet portion that is joined to the corrugated portion.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details protection and load distribution strategies for electrified vehicle traction battery packs. Exemplary battery protection structures may include a corrugated portion and at least one flat sheet portion that are joined together. The battery protection structure may be integrated as part of an outer enclosure assembly of the traction battery pack or could embody a skid plate design that is a separate structure from the outer enclosure assembly. The battery protection structures may be configured for absorbing and transferring energy during vehicle loading events, thereby minimizing the transfer of loads inside the battery pack where relatively sensitive battery internal components are housed. These and other features are discussed in greater detail in the following paragraphs of this detailed description.

Figure 1:
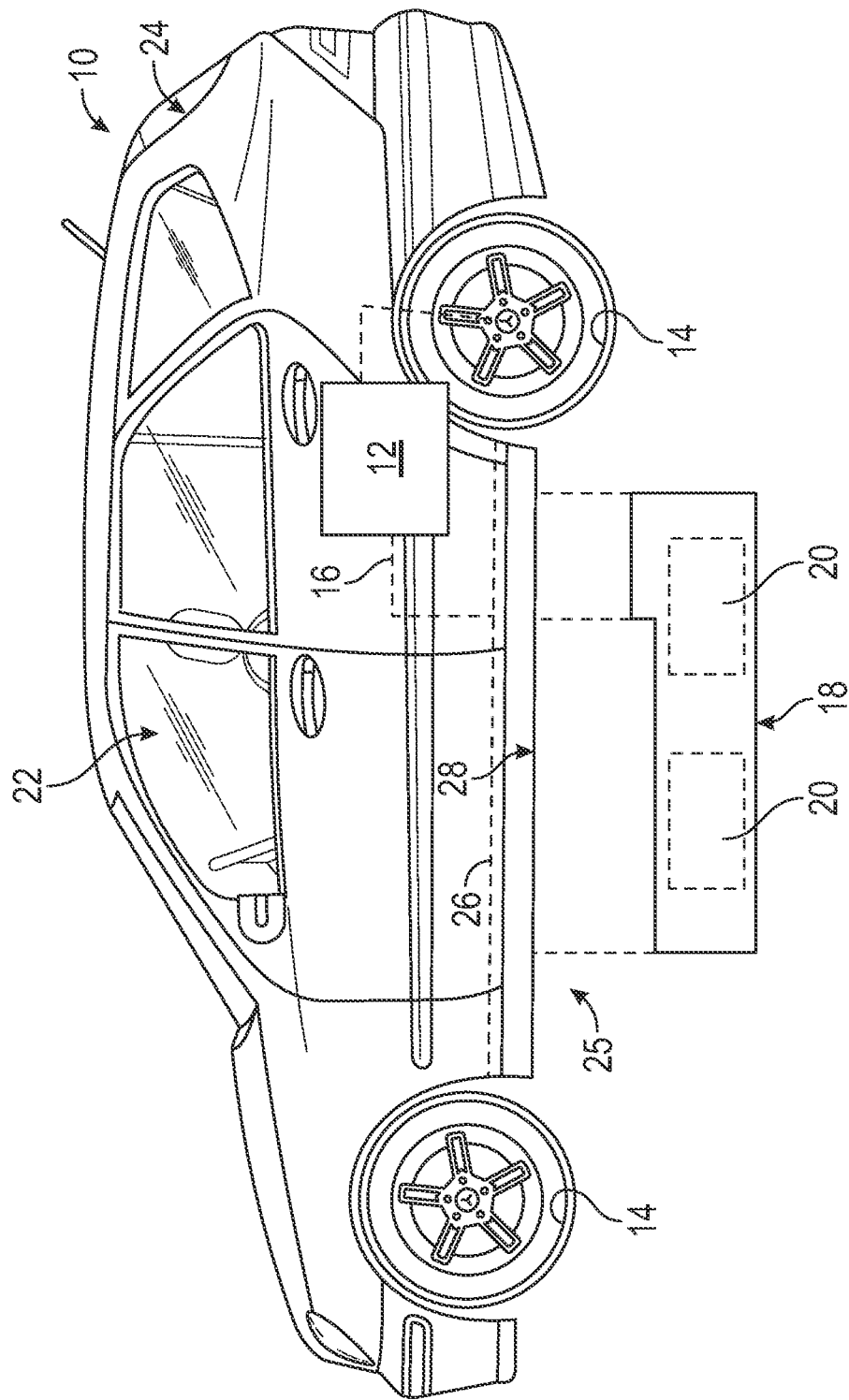
FIG. 1 schematically illustrates an electrified vehicle.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEV's), fuel cell vehicles, etc. Therefore, although not specifically shown in this embodiment, the electrified vehicle 10 could be equipped with an internal combustion engine that can be employed either alone or in combination with other power sources to propel the electrified vehicle 10.

In the illustrated embodiment, the electrified vehicle 10 is a sport utility vehicle (SUV). However, the electrified vehicle 10 could alternatively be a car, a van, a pickup truck, or any other vehicle configuration. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale. Some features may be exaggerated or minimized to emphasize certain details of a particular component or system.

In the illustrated embodiment, the electrified vehicle 10 is a full electric vehicle propelled solely through electric power, such as by one or more electric machines 12, without any assistance from an internal combustion engine. The electric machine 12 may operate as an electric motor, an electric generator, or both. The electric machine 12 receives electrical power and provides a rotational output torque to one or more drive wheels 14.

A voltage bus 16 may electrically couple the electric machine 12 to a traction battery pack 18. The traction battery pack 18 is an exemplary electrified vehicle battery. The traction battery pack 18 may be a high voltage traction battery pack that includes one or more battery arrays 20 (i.e., battery assemblies or groupings of rechargeable battery cells) capable of outputting electrical power to power the electric machine 12 and/or other electrical loads of the electrified vehicle 10. Other types of energy storage devices and/or output devices could alternatively or additionally be used to electrically power the electrified vehicle 10.

The traction battery pack 18 may be mounted at various locations of the electrified vehicle 10. In an embodiment, the electrified vehicle 10 includes a passenger cabin 22 and a cargo space 24 located to the rear of the passenger cabin 22. A floor pan 26 may separate the passenger cabin 22 from a vehicle frame 28, which generally establishes an underbody 25 of the electrified vehicle 10. The traction battery pack 18 may be suspended from or otherwise mounted relative to the vehicle frame 28 such that it is remote from both the passenger cabin 22 and the cargo space 24. The traction battery pack 18 therefore does not occupy space that would otherwise be available for carrying passengers or cargo.

Figure 2:
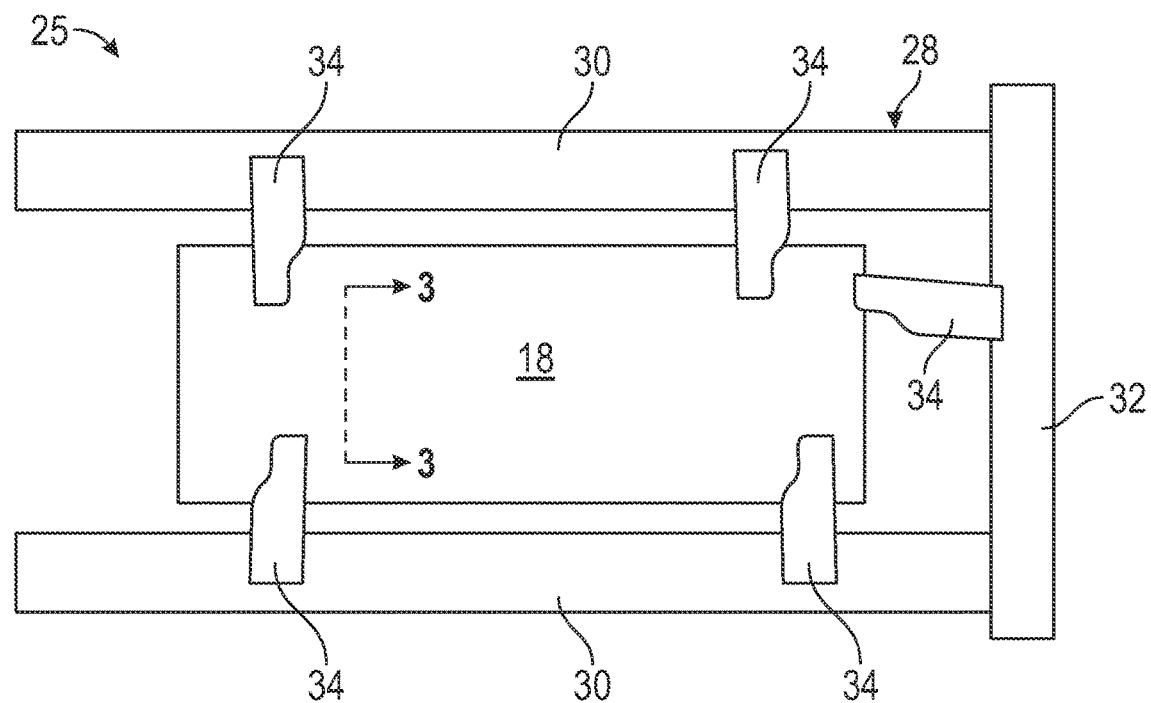
FIG. 2 illustrates select portions of an underside of an electrified vehicle.

Referring now to FIG. 2, the vehicle frame 28 (sometimes referred to simply as a "frame") is the main supporting structure of the electrified vehicle 10, to which various components are attached, either directly or indirectly. The vehicle frame 28 may include a unibody construction, in which the chassis and body of the electrified vehicle 10 are integrated into one another, or may be part of a body-on-frame construction. The vehicle frame 28 may be made of a metallic material, such as steel, carbon steel, or an aluminum alloy, as non-limiting examples.

The vehicle frame 28 may include a plurality of rails 30 (sometimes referred to as "frame rails" or "beams"). The rails 30 extend longitudinally (i.e. in parallel with a length of the electrified vehicle 10). One or more cross members 32 may extend between the rails 30 of the vehicle frame 28. The cross members 32 generally extend transversely relative to the rails 30.

One or more mounting linkages 34 may be used to mount the traction battery pack 18 to the vehicle frame 28. Each mounting linkage 34 may be welded, bolted, or both welded and bolted to the traction battery pack 18 and to the rails 30, the cross members 32, or both. The total number and configuration of the mounting linkages 34 used to mount the traction battery pack 18 relative to the underbody 25 may vary per vehicle design and is therefore not intended to limit this disclosure.

Due at least in part to its mounting location at the underbody 25, the traction battery pack 18 may be exposed to various vehicle loads including, but not limited to, contact loads (e.g., loads imparted during vehicle contact and ground clearance events, such as debris strike and stone pecking, for example), durability loads, and inertial loads. If not isolated or redirected, these loads could be transferred directly into the traction battery pack 18, which could, in turn, generate relatively large forces that can be transferred to the relatively sensitive internal components (e.g., battery cells of the battery arrays 20, etc.) of the traction battery pack 18.

Novel battery protection structures for protecting the traction battery pack 18 and for distributing loads during contact events are therefore proposed in this disclosure. As discussed in greater detail below, the battery protection structures described herein are capable of absorbing, redirecting, and/or distributing loads that may be imparted during vehicle loading events, thereby substantially minimizing the transfer of the loads into the traction battery pack 18.

Figure 3:
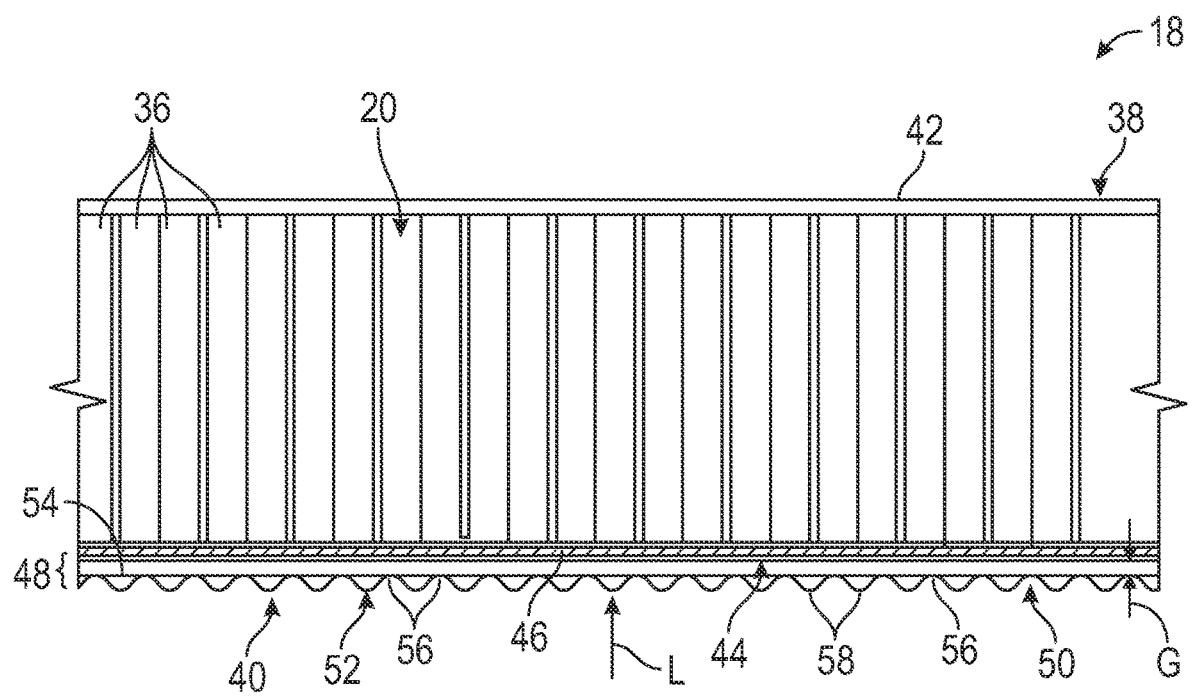
FIG. 3 is a cross-sectional view of a traction battery pack that is equipped with a battery support structure.

FIG. 3 is a cross-sectional view of the traction battery pack 18 of FIG. 2. The traction battery pack 18 may house a plurality of battery cells 36 that store energy for powering various electrical loads of the electrified vehicle 10, such as the electric machine 12 of FIG. 1, for example. In an embodiment, the battery cells 36 are prismatic, lithium-ion battery cells. However, battery cells having other geometries (cylindrical, pouch, etc.), other chemistries (nickel-metal hydride, lead-acid, etc.), or both could alternatively be utilized within the scope of this disclosure. Although not shown in FIG. 3, the traction battery pack 18 could house various other battery components (e.g., electronics, wiring, etc.).

The battery cells 36 may be grouped together in one or more battery arrays 20. The total number of battery cells 36 employed within the traction battery pack 18 is not intended to limit this disclosure.

An outer enclosure assembly 38 may house each battery array 20, heat exchanger plate 44, and other battery components the traction battery pack 18. Since the battery arrays 20 and the other battery components are housed inside the outer enclosure assembly 38, these components are considered battery internal components of the traction battery pack 18. The battery internal components are examples of the types of sensitive battery components that could become damaged if contact loads are transferred inside the traction battery pack 18 during vehicle loading events.

In an embodiment, the outer enclosure assembly 38 is a sealed enclosure. The outer enclosure assembly 38 may include any size, shape, and configuration within the scope of this disclosure. The outer enclosure assembly 38 may include a tray 40 and a cover 42 that cooperate to surround and enclose the battery internal components.

Each battery array 20 may be positioned relative to a heat exchanger plate 44 (sometimes referred to as a "cold plate"). The heat exchanger plate 44 could either be a separate component from the battery array 20 or could be an integrated component of the battery array 20. The battery array 20 may be positioned over top of the heat exchanger plate 44 such that the heat exchanger plate 44 is positioned between the battery array 20 and the tray 40 of the outer enclosure assembly 38.

The heat exchanger plate 44 may be part of a liquid cooling system that is associated with the traction battery pack 18 and is configured for thermally managing the battery cells 36 of the battery array 20. For example, heat may be generated and released by the battery cells 36 during charging operations, discharging operations, extreme ambient conditions, etc. The heat may be conducted from the battery cells 36 to the heat exchanger plate 44 for dissipating the heat. The heat exchanger plate 44 may thus function as a heat sink for removing heat from the heat sources (e.g., the battery cells 36).

In some embodiments, a thermal interface material 46 may be disposed between the battery array 20 and the heat exchanger plate 44 for facilitating heat transfer between these neighboring components. The thermal interface material 46 may include an epoxy resin, a silicone based material, a thermal grease, etc.

Figure 4:
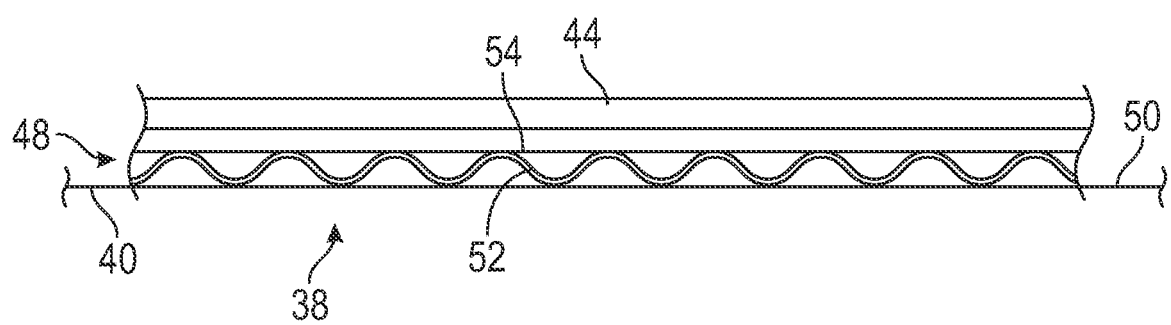
FIG. 4 illustrates an exemplary battery support structure.

The traction battery pack 18 may further include a battery protection structure 48. In an embodiment, the battery protection structure 48 may be integrated as part of a floor section 50 of the tray 40 of the outer enclosure assembly 38. In another embodiment, the battery protection structure 48 is a completely separate structure from the tray 40 and may be positioned between the floor section 50 and the heat exchanger plate 44 at a location inside the outer enclosure assembly 38 (see FIG. 4).

The battery protection structure 48 may include a corrugated portion 52 and a flat sheet portion 54. The corrugated portion 52 may be formed (e.g., stamped) in the floor section 50 of the tray 40 to establish an alternating pattern of ridges 56 and grooves 58. The ridges 56 and the grooves 58 establish the corrugations of the corrugated portion 52. The corrugated portion 52 may be configured to deform for absorbing energy during vehicle loading events, such as when a concentrated load L is applied to the tray 40, for example.

The flat sheet portion 54 may be secured to the corrugated portion 52. The flat sheet portion 54 may be secured at the ridges 56 and thus may be positioned in the space between the corrugated portion 52 and the heat exchanger plate 44 at a location inside the outer enclosure assembly 38. The flat sheet portion 54 may be secured to the corrugated portion 52 using a structural adhesive, welds, rivets, etc. The flat sheet portion 54 is designed to absorb and distribute the loads that are absorbed by the corrugated portion 52 and thereby minimize the loads from impinging upon the battery cells 36, the heat exchanger plate 44, and/or any other battery sensitive components of the traction battery pack 18.

Figure 5:
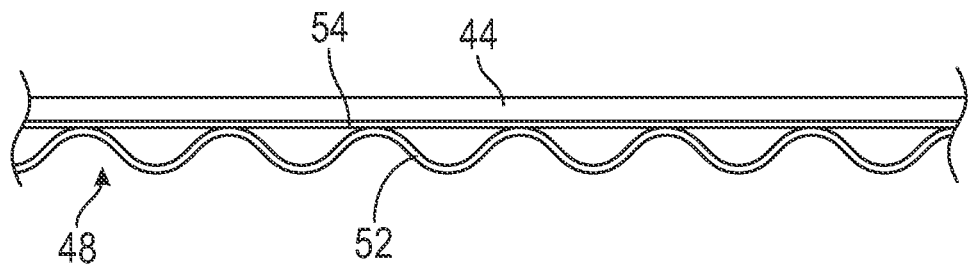
FIG. 5 illustrates another exemplary battery support structure.

In an embodiment, a gap G extends between the heat exchanger plate 44 and the flat sheet portion 54. In another embodiment, the heat exchanger plate 44 is positioned in direct contact with the flat sheet portion 54 of the battery protection structure 48 (see FIG. 5).

The sizing (e.g., height between the ridges 56 and the grooves 58) of the corrugations of the corrugated portion 52 and the thickness of the flat sheet portion 54 may vary depending on various design parameters. For example, these and other parameters could vary based on available packaging space and displacement targets, among other factors.

The corrugated portion 52 and the flat sheet portion 54 may be made of a metallic material or a combination of metallic materials. Exemplary metallic materials include but are not limited to steel, aluminum, and boron-alloyed steel. In an exemplary embodiment, both the corrugated portion 52 and the flat sheet portion 54 may be constructed out of a boron-alloyed steel. However, other material configurations are further contemplated within the scope of this disclosure, including the use of rigid polymers, for example.

Figure 6:
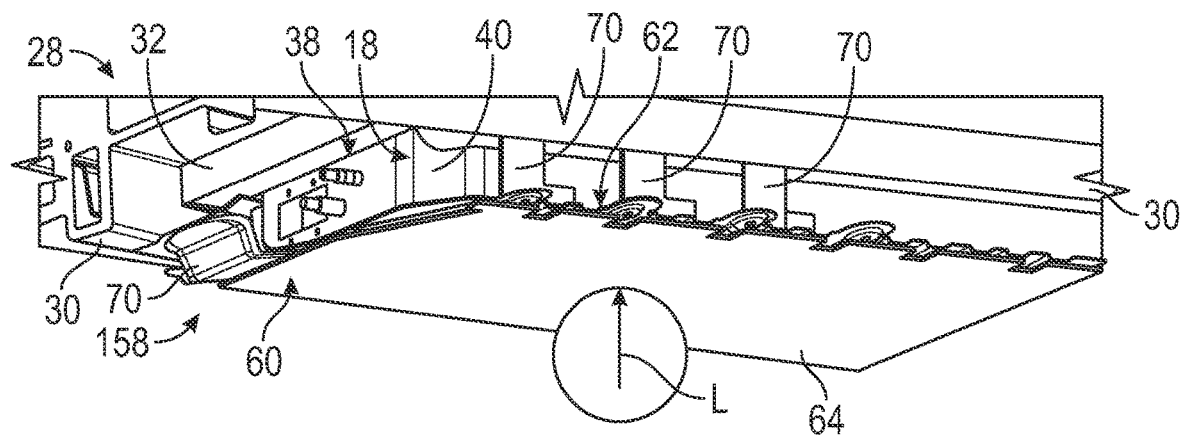
FIG. 6 illustrates another exemplary battery support structure.
Figure 7:
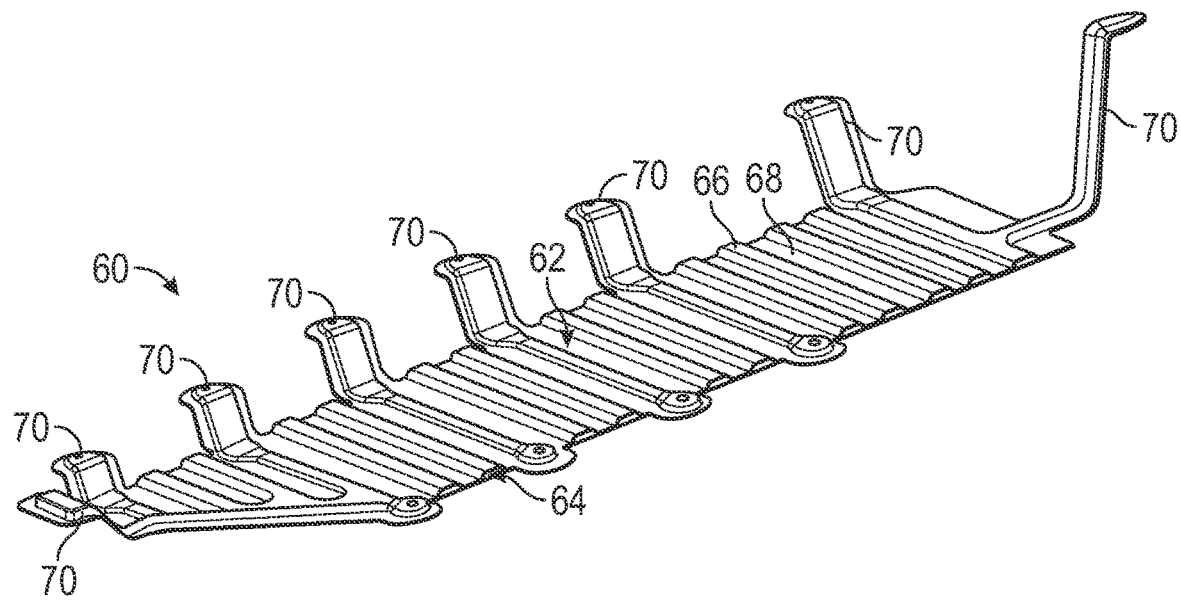
FIG. 7 illustrates another exemplary battery support structure.

FIGS. 6 and 7 illustrate another exemplary battery protection structure 148 for protecting a traction battery pack 18 that may be mounted to the underbody 25 of the electrified vehicle 10. In this embodiment, the battery protection structure 48 is configured as a skid plate assembly 60 that may be arranged at least partially about the tray 40 of the outer enclosure assembly 38 and mounted to the vehicle frame 28 for supporting and protecting the traction battery pack 18 from contact loads. The skid plate assembly 60 is therefore a completely separate structure from the outer enclosure assembly 38 of the traction battery pack 18. For example, the tray 40 of the outer enclosure assembly 38 may separate the battery internal components of the traction battery pack 18 from contacting the skid plate assembly 60.

The skid plate assembly 60 may include a corrugated portion 62 and a flat sheet portion 64. The corrugated portion 62 may be a stamped corrugated sheet that includes an alternating pattern of ridges 66 and grooves 68. The corrugated portion 62 may be configured to deform for absorbing energy during contact events, such as when a concentrated load L is applied to the skid plate assembly 60, for example.

The corrugated portion 62 may include a plurality of mounting brackets 70 that are configured for mounting the skid plate assembly 60 to one or more of the rails 30 and/or cross members 32 of the vehicle frame 28. The mounting brackets 70 may be secured to the rails 30 and/or cross members 32 via mechanical fasteners or other joining techniques. Although shown as integral components of the corrugated portion 62, the mounting brackets 70 could alternatively or additionally be provided on the flat sheet portion 64.

The flat sheet portion 64 may be secured to the corrugated portion 62. The flat sheet portion 64 may be secured to the corrugated portion 62 using a structural adhesive, welds, rivets, etc. The flat sheet portion 64 is designed to absorb and distribute the loads that are absorbed by the corrugated portion 62 and thereby minimize the loads from impinging upon the battery sensitive components of the traction battery pack 18.

Figure 8:
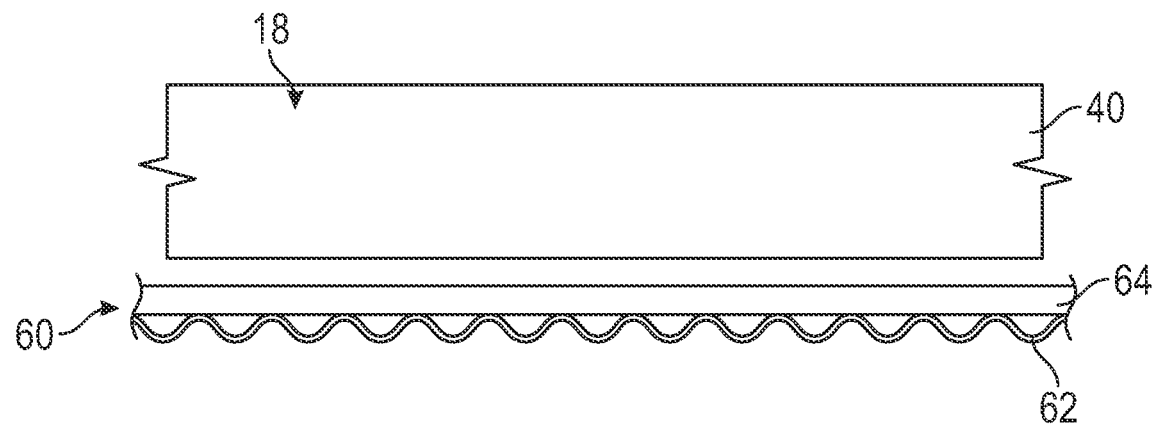
FIG. 8 illustrates another exemplary battery support structure.
Figure 9:
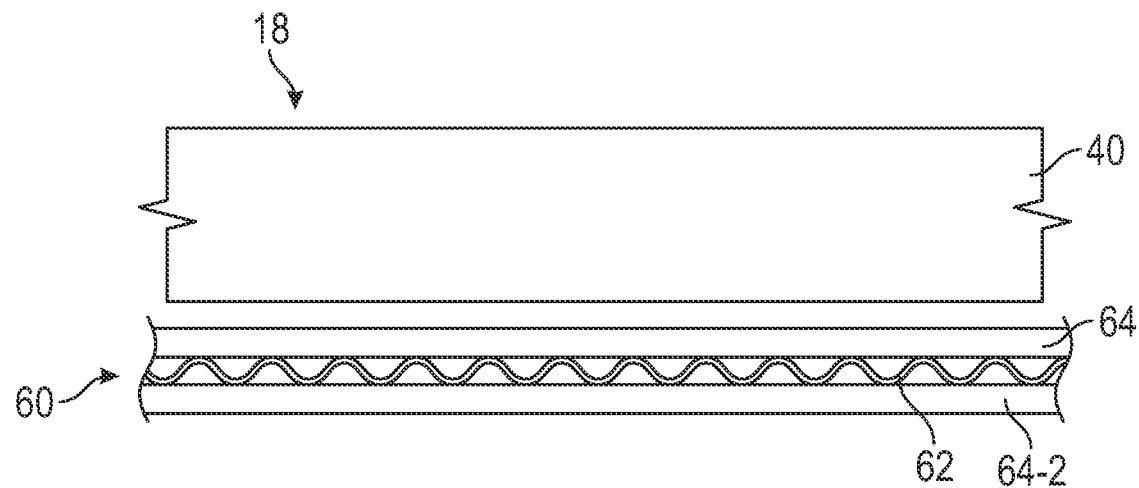
FIG. 9 illustrates yet another exemplary battery support structure.

In an embodiment, the skid plate assembly 60 is configured such that the corrugated portion 62 is positioned in relatively close proximity to the tray 40 of the traction battery pack 18, and the flat sheet portion 64 is positioned on an opposite side (contact side) of the corrugated portion 62 from the tray 40 (see FIGS. 6 and 7). The corrugated portion 62 may directly contact the tray 40 or may be slightly gapped relative to the tray 40 in such an embodiment. In another embodiment, the skid plate assembly 60 is configured such that the flat sheet portion 64 is positioned in relatively close proximity to the tray 40 of the traction battery pack 18 and the corrugated portion 62 is positioned on an opposite side (contact side) of the flat sheet portion 64 from the tray 40 (see FIG. 8). The flat sheet portion 64 may directly contact the tray 40 or may be slightly gapped relative to the tray 40 in such an embodiment. In yet another embodiment, the corrugated portion 62 may be sandwiched between the flat sheet portion 64 and an additional flat sheet portion 64-2 (see FIG. 9).

The sizing of the corrugations of the corrugated portion 62 and the thickness of the flat sheet portion(s) 64 may vary depending on various design parameters. For example, these parameters could vary based on available, packaging space and design displacement targets, among other factors.

The corrugated portion 62 and the flat sheet portion(s) 64 may be made of a metallic material or a combination of metallic materials. Exemplary metallic materials include but are not limited to steel, aluminum, and boron-alloyed steel. In an exemplary embodiment, both the corrugated portion 52 and the flat sheet portion 54 may be constructed out of a boron-alloyed steel. However, other material configurations are contemplated within the scope of this disclosure, including the use of rigid polymers, for example.

The exemplary battery protection structures of this disclosure better protect underbody-mounted traction battery packs during vehicle loading events. The proposed structures absorb and distribute contact loads, thereby minimizing the transfer of these loads to internal sections of the traction battery pack where relatively sensitive battery internal components are housed during loading events. The proposed structures are easily serviceable and may reduce the need to replace battery internal components in response to loading events.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrified vehicle, comprising:
    a traction battery pack including an outer enclosure assembly and a heat exchanger plate housed inside the outer enclosure assembly; and
    a battery protection structure configured to minimize a transfer of a load to the heat exchanger plate during a vehicle loading event,
    wherein the battery protection structure includes a corrugated portion integrated into a tray of the outer enclosure assembly,
    wherein the corrugated portion is non-contiguous with any portion of the heat exchanger plate.

2. The electrified vehicle as recited in claim 1, comprising a flat sheet portion that is jointed directly to the corrugated portion.

3. The electrified vehicle as recited in claim 2, wherein the flat sheet portion is a separate and distinct component from any portion of the heat exchanger plate.

4. The electrified vehicle as recited in claim 1, wherein the corrugated portion establishes a floor section of the tray.

5. The electrified vehicle as recited in claim 4, wherein the floor section provides a bottom-most portion of the tray.

* * * * *